United States Patent [19]

Ray et al.

[11] Patent Number: 5,755,506
[45] Date of Patent: May 26, 1998

[54] ILLUMINATED BADGE

[76] Inventors: Eric A. Ray, 6001 FM 7, Lot A5, San Antonio, Tex. 78244; Steven H. Roberts, 822 Ogden, Apt. No. 2, San Antonio, Tex. 78212; Tommy D. Ray, P.O. Box 538, Lakehills, Tex. 78063

[21] Appl. No.: 730,183

[22] Filed: Oct. 15, 1996

[51] Int. Cl.⁶ .................................................. F21L 15/08
[52] U.S. Cl. ........................... 362/103; 40/1.5; 362/31; 362/104
[58] Field of Search ............................ 362/103, 104, 362/31; 40/1.5

[56] References Cited

U.S. PATENT DOCUMENTS

| 2,265,670 | 12/1941 | Platt | 362/103 |
|---|---|---|---|
| 3,257,747 | 6/1966 | Schimmel . | |
| 3,805,047 | 4/1974 | Dockstader . | |
| 3,818,209 | 6/1974 | Roth . | |
| 4,076,976 | 2/1978 | Fenton . | |
| 4,556,932 | 12/1985 | Lehrer et al. . | |
| 4,638,409 | 1/1987 | Berman | 362/103 |
| 5,010,665 | 4/1991 | Clinkscales . | |
| 5,111,366 | 5/1992 | Rife et al. | 362/31 |
| 5,243,504 | 9/1993 | Seizer | 362/104 |
| 5,576,078 | 11/1996 | Schatz | 362/31 |

FOREIGN PATENT DOCUMENTS

| 2347607 | 11/1977 | France | 362/104 |
|---|---|---|---|

*Primary Examiner*—Carroll B. Dority
*Attorney, Agent, or Firm*—Stephen R. Greiner

[57] ABSTRACT

A badge or sign including a plate formed of light-transmissive material with a front side for bearing indicia. A light source is positioned within the plate to illuminate it from within. A pin is secured to the plate for attaching the plate to an article of apparel. Adjacent the pin, a clip is secured to the plate for carrying a battery capable of powering the light source. The clip has an integral hook for holding the free end of the pin. The pin and the hook are electrically connected with the battery and the light source so that the engagement of the pin with the hook to secure the badge to an article of apparel acts to permit the flow of an electrical current from the battery to the light source and to illuminate the light source. Disengagement of the pin and hook electrically disconnects the battery from the light source.

20 Claims, 2 Drawing Sheets

ILLUMINATED BADGE

FIELD OF THE INVENTION present invention relates generally to card, picture and sign exhibiting and, more particularly, to an illuminated badge which may be secured to, and worn on, an article of apparel.

BACKGROUND OF THE INVENTION

Electrically illuminated devices of diverse construction have been proposed for use as jewelry, badges, and attention grabbing novelties adapted for attachment to an article of apparel. One shortcoming of these devices is that they generally require some disassembly of their constituent parts to deenergize the light source. Such disassembly often leads to the loss of these parts so that the device can no longer be made to function. Complete replacement of the device may then be required.

SUMMARY OF THE INVENTION

In light of the problems associated with the prior art, it is a principal object of the invention to provide an illuminated novelty badge for attachment to an article of apparel with a light source that may be selectively energized without disassembly of the badge.

It is another object of the invention to provide a badge of the type described with a pin member which serves to secure the badge to an article of apparel and which also serves as a switch element to selectively energize the light source of the badge.

It is an object of the invention to provide improved elements and arrangements thereof in an illuminated badge which is uncomplicated in construction, inexpensive in manufacture, light in weight, dependable in use and otherwise well adapted in accomplishing its intended objects.

Briefly, the badge in accordance with this invention achieves the intended objects by featuring a plate with a battery-powered light source. The plate is provided with a pin for attachment to an article of apparel. Adjacent the pin, a clip, having an integral hook, carries a battery. The pin and the hook are electrically connected with the battery and the light source so that the engagement of the pin with the hook permits the flow of current from the battery to the light source and illuminates the light source. Disengagement of the pin and hook disconnects the battery from the light source to conserve battery power.

The foregoing and other objects, features and advantages of the present invention will become readily apparent upon further review of the following detailed description of the preferred embodiment as illustrated in the accompanying drawings.

BRIEF DESCRIPTION OF THE DRAWINGS

The present invention may be more readily described with reference to the accompanying drawings, in which.

Similar reference characters denote corresponding features consistently throughout the accompanying drawings.

DETAILED DESCRIPTION OF THE PREFERRED EMBODIMENT

Figure 1:
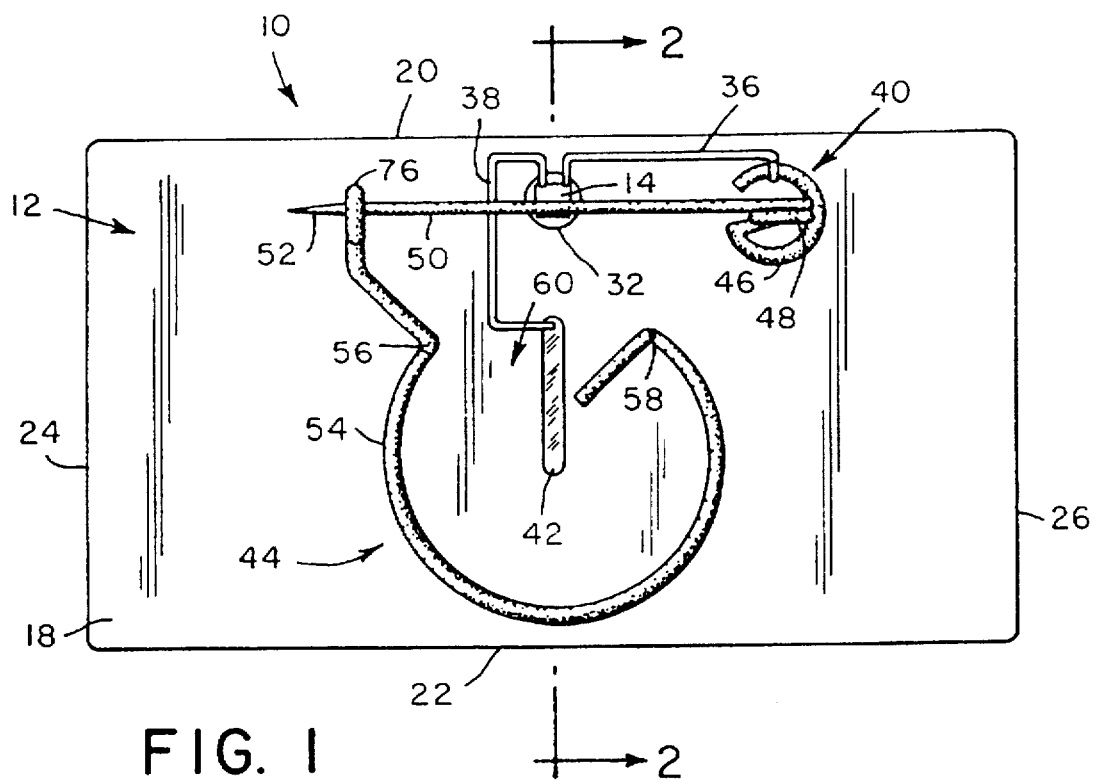
FIG. 1 is rear elevational view of an illuminated badge in accordance with the present invention.

Referring now to the FIGS., an illuminated badge in accordance with the present invention is shown generally at 10. The badge 10 includes a plate 12 formed of a light-transmissive material, such as Lucite, having a light-emitting diode 14 secured within it. In use, the light-emitting diode 14 is energized to fully illuminate the plate 12 from its interior.

Although the plate 12 may be provided with surface contours of diverse form, the plate preferably has an even thickness and a rectangular outline for ease of manufacture. As shown, therefore, the plate 12 includes a planar, front side 16 and a planar, back side 18. The plate 12 also includes a top edge 20, a bottom edge 22, and a pair of opposed, left and right side edges 24 and 26 respectively.

The plate 12 may be provided in any size convenient for wearing on an article of apparel. Preferably, the plate 12 measures about 0.25 inches (0.64 cm) in thickness from the front side 16 to the back side 18 thereof. The height of the plate 12 is about 1.38 inches (3.51 cm) from the top edge 20 to the bottom edge 22 thereof. The plate 12 is also approximately 2.50 inches (6.35 cm) in width between the opposed side edges 24 and 26.

A partially transparent sheet 28 bearing a slogan, trademark, logo, advertisement or other indicia (not shown) may be secured by an adhesive backing 30 to the front side 16 of the plate 12. If desired, however, indicia may be provided to the plate 12 by other suitable means like etching or painting such directly onto the exterior of the plate 12.

A cavity or recess 32 is provided in the back side 18 of the plate 12 for receiving the light-emitting diode 14 and an opaque light deflector 34 which may comprise, for example, a drop of paint for aiding in the distribution of light from the light-emitting diode throughout the plate. Flexible electrical leads 36 and 38 extend from the light-emitting diode 14 and the recess 32. The lead 36 is connected to a pin member 40 which may be utilized to secure the badge 10 to an article of apparel. The other lead 38 is connected to an electrical contact 42 centrally located within a battery retaining clip 44. The leads 36 and 38 and the light-emitting diode 14 and contact 42 are secured to the plate 12 with an adhesive or other convenient means.

The pin member 40 is integrally formed from a single length of resilient wire so as to include a base portion 46, a biasing portion 48 and an elongated, pin portion 50. The base portion 46 is circular in shape and is adhesively fastened to the back side 18 of the plate 12. The biasing portion 48 extends outwardly from the base portion 46 and comprises a wound coil. Projecting from the biasing portion 48 is the pin portion 50 which terminates in a pointed, free end 52.

Secured by an adhesive to the back side 18 of the plate 12 adjacent the pin member 40 is the battery retaining clip 44. Like the pin member 40, the clip 44 also comprises a single length of resilient wire bent or otherwise formed into a suitable shape. With the clip 44, however, that shape somewhat resembles a "G" in form when viewed from the rear as in FIG. 1.

The clip 44 includes an arcuate side wall portion 54 having spaced ends 56 and 58 which define an opening 60 for the passage of the battery 62. The side wall 54 preferably has a radius of curvature approximating that of the battery 62 for a snug fit therebetween. To further enhance this fit, a semicircular segment of the side wall 54 is provided with a height approximating that of the battery 62 by sinuously folding the wire comprising the clip 44 upon itself so that it includes three legs 64, 66 and 68 connected by tight bends 70 and 72 positioned opposite one another along the wall 54.

Figure 2:
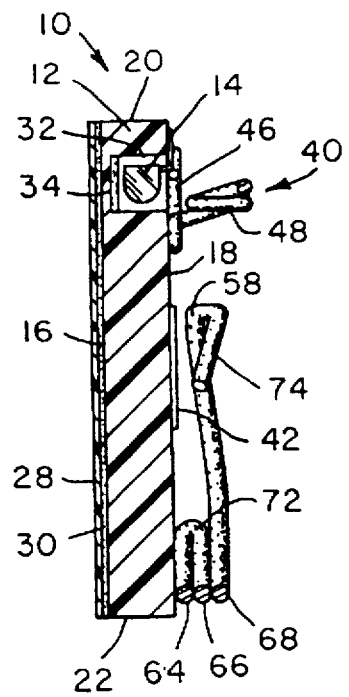
FIG. 2 is a cross-sectional view taken along line 2—2 of FIG. 1.
Figure 3:
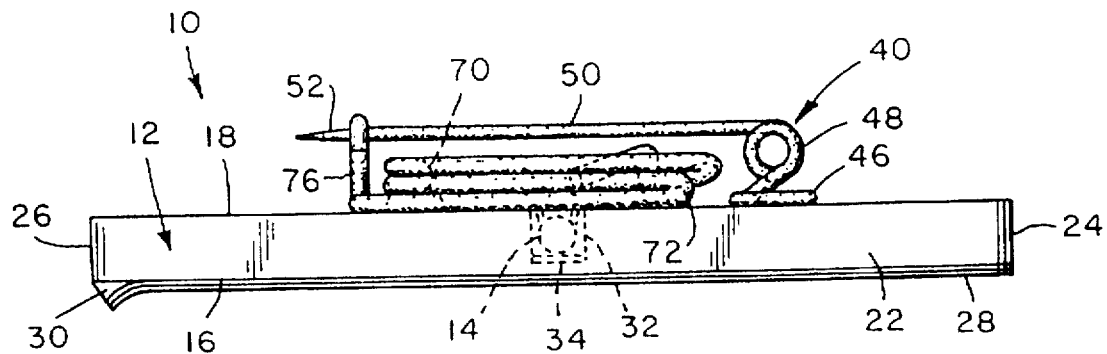
FIG. 3 is a bottom plan view of the illuminated badge.

With reference to FIG. 2, the leg 68 may be seen to slope gradually from its raised position atop the semicircular segment to a site relatively closer to the back side 18 of the plate 12 at end 58. A bent retaining portion 74 extends inwardly from the end 58 of the side wall portion 54 and terminates at a point adjacent the electrical contact 42.

The clip 44 further includes a hook portion 76 which extends from the end 56 of the side wall portion 54 and is adapted to selectively receive and retain the free end 52 of the pin portion 50. Through the retaining portion 74 of the clip 44, the hook portion 76 is connected to one side or terminal of the battery 62 which is installed within the clip by sliding it under the retaining portion. Through the electrical contact 42 and leads 36 and 38, the pin member 40 is connected to the opposite side or terminal of the battery 62. Thus, the hook portion 76 and pin portion 50 can serve as a switch to energize the light-emitting diode 14.

Figure 4:
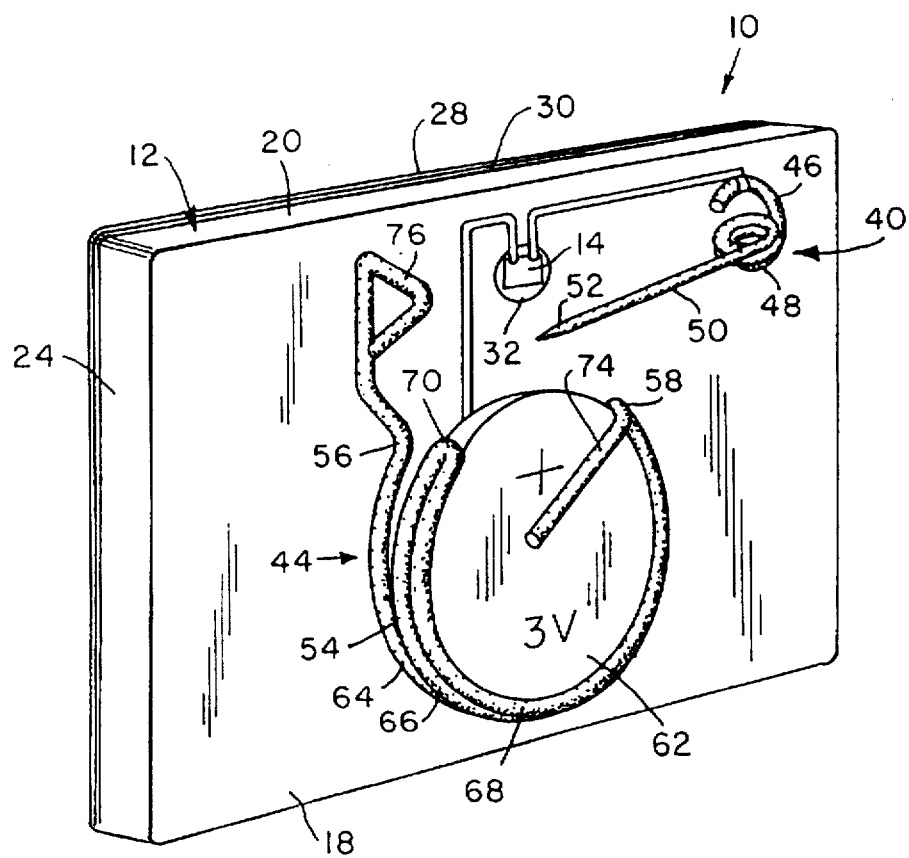
FIG. 4 is a perspective view of the illuminated badge.

When the pin portion 50 is engaged with the hook portion 76, such as when the badge 10 is fastened to the apparel of a user, the switch is closed to provide electrical current from the battery 62 to the light-emitting diode 14. With electrical current flowing to the light-emitting diode 14, it is illuminated to backlight the sheet 28 and display any indicia provided thereon. When the pin portion 50 is disengaged from hook portion 76, the switch is opened, as shown in FIG. 4, interrupting the flow of electrical current from the battery 62 to the light-emitting diode 14 thereby conserving battery power.

While the invention has been described with a high degree of particularity, it will be appreciated by those skilled in the art that numerous modifications and substitutions may be made thereto. For example, a flashing circuit may be placed in series between the battery and the light-emitting diode for intermittent illumination of the badge. Therefore, it is to be understood that the present invention is not limited to the sole embodiment described above, but encompasses any and all embodiments within the scope of the following claims.

We claim:

1. An illuminated sign, comprising:
   a light-transmissive plate having a front side and a back side, said front side being adapted to bear indicia and said back side having a recess therein;
   a light source positioned within said recess in said plate;
   a battery for energizing said light source;
   a pin secured to said back side of said plate, said pin having a pointed, free end;
   a hook secured to said back side of said plate for selectively holding said free end of said pin; and,
   means for electrically connecting said pin, said hook, said battery and said light source whereby said pin and said hook act as a switch to control the flow of an electrical current from said battery to said light source.

2. The illuminated sign according to claim 1 wherein said plate is formed of a transparent plastic material.

3. The illuminated sign according to claim 1 wherein said light source is a light-emitting diode.

4. The illuminated sign according to claim 1 wherein said hook is integrally formed with a battery retaining clip and said clip is secured to said back side of said plate.

5. The illuminated sign according to claim 1 further comprising a light-transmissive sheet adapted to bear indicia adhesively secured to said front side of said plate.

6. The illuminated sign according to claim 1 further comprising an opaque, light deflector positioned in said recess in said plate between said light source and said front side thereof.

7. A novelty badge, comprising:
   a plate formed of light-transmissive material, said plate having a front side and a back side, said front side being adapted to bear indicia;
   a light source positioned within said plate to illuminate the front side thereof;
   a pin secured to said plate for securing said badge to an article of apparel, said pin having a free end;
   a clip secured to said plate for carrying a battery, said clip being electrically conductive and adapted for contact with the battery, said clip having an integral hook for selectively holding said free end of said pin; and,
   said pin and said hook being electrically connected with said clip and said light source whereby the engagement of said pin with said hook to secure said badge to an article of apparel will energize said light source when a battery is carried by said clip.

8. The badge according to claim 7 wherein said pin member is constructed from a single length of wire and said clip is constructed from a single length of wire.

9. The badge according to claim 8 wherein said pin member includes:
   a base portion for fastening to the back side of said plate;
   a coiled, biasing portion integrally formed with said base portion and extending therefrom; and,
   a pin portion, having said pointed, free end, integrally formed with said biasing portion and extending therefrom.

10. The badge according to claim 8 wherein said clip includes:
    a circular wall secured to the back side of said plate for engaging the periphery of said battery;
    a retaining portion integrally formed with said circular wall,
    said retaining portion being spaced from said plate for engaging the top of said battery; and,
    a hook portion, having said hook, integrally formed with said circular wall.

11. The badge according to claim 7 further comprising a light-transmissive sheet adapted to bear indicia adhesively secured to said front side of said plate.

12. The badge according to claim 7 wherein said light source is a light-emitting diode.

13. The badge according to claim 12 further comprising a light-reflective material positioned between said light-emitting diode and the front side of said plate for aiding in the distribution of light from said light-emitting diode throughout said plate.

14. A badge, comprising:
    a plate formed of an electrically nonconductive material, said plate having a front side and a back side, said front side being adapted to bear indicia;
    a light source secured to said plate so as to illuminate the front side thereof;
    a battery for energizing said light source;
    a pin secured to said plate for securing said badge to an article of apparel, said pin having a pointed, free end;
    a clip secured to said plate for carrying said battery, said clip having an integral hook for selectively holding said free end of said pin; and,
    said pin and said hook being electrically connected with said battery and said light source so that the engagement of said pin with said hook to secure said badge to an article of apparel acts to permit the flow of an electrical current from said battery to said light source to illuminate said plate and disengagement of said pin and hook electrically disconnects said battery from said light source.

15. The badge according to claim 14 wherein said plate is formed of a light-transmissive material.

16. The badge according to claim 15 wherein said light source is a light-emitting diode.

17. The badge according to claim 15 further comprising a light-reflective material positioned between said light source and the front side of said plate for aiding in the distribution of light from said light source throughout said plate.

18. The badge according to claim 14 wherein said pin member and said clip are each, respectively, constructed from a single length of wire.

19. The badge according to claim 18 wherein said pin member includes:

a base portion fastened to the back side of said plate;

a coiled, biasing portion integrally formed with said base portion and extending therefrom; and, a pin portion, having said pointed, free end, integrally formed with said biasing portion and extending therefrom.

20. The badge according to claim 18 wherein said clip includes:

a circular wall secured to the back side of said plate for engaging the periphery of said battery;

a retaining portion integrally formed with said circular wall, said retaining portion being spaced from said plate for engaging the top of said battery; and, a hook portion, having said hook, integrally formed with said circular wall.

* * * * *